United States Patent
Meardi et al.

(10) Patent No.: US 11,887,366 B2
(45) Date of Patent: Jan. 30, 2024

(54) OBJECT ANALYSIS

(71) Applicant: V-NOVA INTERNATIONAL LIMITED, London (GB)

(72) Inventors: Guido Meardi, London (GB); Guendalina Cobianchi, London (GB); Balázs Keszthelyi, London (GB); Ivan Makeev, London (GB); Simone Ferrara, London (GB); Stergios Poularakis, London (GB)

(73) Assignee: V-NOVA INTERNATIONAL LIMITED

( * ) Notice: Subject to any disclaimer, the term of this patent is extended or adjusted under 35 U.S.C. 154(b) by 179 days.

(21) Appl. No.: 17/431,002

(22) PCT Filed: Feb. 11, 2020

(86) PCT No.: PCT/GB2020/050312
§ 371 (c)(1),
(2) Date: Aug. 13, 2021

(87) PCT Pub. No.: WO2020/165575
PCT Pub. Date: Aug. 20, 2020

(65) Prior Publication Data
US 2022/0172473 A1    Jun. 2, 2022

(30) Foreign Application Priority Data

Feb. 13, 2019  (EP) ..................... 19386008

(51) Int. Cl.
*G06V 20/40* (2022.01)
*G06V 10/25* (2022.01)
*G06V 10/82* (2022.01)

(52) U.S. Cl.
CPC .............. *G06V 20/41* (2022.01); *G06V 10/25* (2022.01); *G06V 10/82* (2022.01); *G06F 2218/00* (2023.01)

(58) Field of Classification Search
CPC ........ G06V 20/41; G06V 10/25; G06V 10/82; G06F 2218/00
See application file for complete search history.

(56) References Cited

U.S. PATENT DOCUMENTS

| | | | |
|---|---|---|---|
| 9,313,495 B2 * | 4/2016 | Rossato | H04N 19/57 |
| 10,402,670 B2 * | 9/2019 | Zou | G06V 20/56 |
| 10,621,725 B2 * | 4/2020 | Fan | G06V 10/82 |

(Continued)

FOREIGN PATENT DOCUMENTS

WO    2013-171168    11/2013

OTHER PUBLICATIONS

International Search Report and Written Opinion for PCT/GB2020/050312 dated Apr. 28, 2020.

(Continued)

*Primary Examiner* — Utpal D Shah
(74) *Attorney, Agent, or Firm* — WORKMAN NYDEGGER

(57) ABSTRACT

A method comprising performing object detection within a set of representations of a hierarchically-structured signal, the set of representations comprising at least a first representation of the signal at a first level of quality and a second representation of the signal at a second, higher level of quality.

16 Claims, 5 Drawing Sheets

(56) References Cited

U.S. PATENT DOCUMENTS

| | | | |
|---|---|---|---|
| 11,393,082 B2* | 7/2022 | Mathew | G06T 7/0004 |
| 2013/0301946 A1* | 11/2013 | Rossato | G06T 9/40 |
| | | | 382/236 |
| 2013/0322530 A1* | 12/2013 | Rossato | H04N 19/50 |
| | | | 375/240.12 |
| 2016/0140424 A1* | 5/2016 | Wang | G06F 18/2414 |
| | | | 382/156 |
| 2017/0206434 A1 | 7/2017 | Nariyambut et al. | |
| 2018/0300880 A1 | 10/2018 | Fan et al. | |
| 2020/0389660 A1* | 12/2020 | Makeev | H04N 19/46 |

OTHER PUBLICATIONS

Wei Zhang et al: "Real-time Accurate Object Detection using Multiple Resolutions", Proceedings of the IEEE International Conference on Computer Vision (ICCV), Oct. 1, 2007 (Oct. 1, 2007), pp. 1-8, XP055404389, ISSN: 1550-5499, DOI: 10.1109/ICCV.2007.4409057.

* cited by examiner

OBJECT ANALYSIS

CROSS-REFERENCE TO RELATED APPLICATIONS

The present application is a 371 US Nationalization of International Patent Application No. PCT/GB2020/050312, filed Feb. 11, 2020, which claims priority to UK Patent Application No. 19386008.7, filed Feb. 13, 2019, the entire disclosures of which are incorporated herein by reference.

TECHNICAL FIELD

The present disclosure relates to object analysis.

BACKGROUND

Object analysis may be performed within an image and/or a video. Examples of types of object analysis include, but are not limited to, object detection and object recognition. Object analysis may be performed within images and video of varied resolutions and compression levels, for example images in an uncompressed file format or in a compressed file format. Examples of uncompressed file formats are the BMP and TGA file formats. An example of a compressed image file format is JPEG. An example of a compressed video file format is H.264/MPEG-4.

SUMMARY

According to first embodiments, there is provided a method comprising performing object detection within a set of representations of a hierarchically-structured signal, the set of representations comprising at least a first representation of the signal at a first level of quality and a second representation of the signal at a second, higher level of quality.

According to second embodiments, there is provided a method comprising performing object analysis using at least part of a representation of a signal at a first level of quality, the representation of the signal at the first level of quality having been generated using a representation of the signal at a second, higher level of quality, wherein performing object analysis comprises performing object detection and/or object recognition.

According to third embodiments, there is provided a method comprising performing object analysis within an image in a multi-resolution image format in which multiple versions of an image are available at different respective image resolutions.

According to fourth embodiments, there is provided a method comprising partially decoding a representation of a signal in response to object analysis performed within the representation detecting an object in a region of interest within the representation of the signal, wherein the partial decoding is performed in relation to the region of interest.

According to fifth embodiments, there is provided apparatus configured to perform a method according to any of the first through fourth embodiments.

According to sixth embodiments, there is provided a computer program arranged, when executed, to perform a method according to any of the first through fourth embodiments.

Further features and advantages will become apparent from the following description, given by way of example only, which is made with reference to the accompanying drawings.

DETAILED DESCRIPTION

Figure 1:
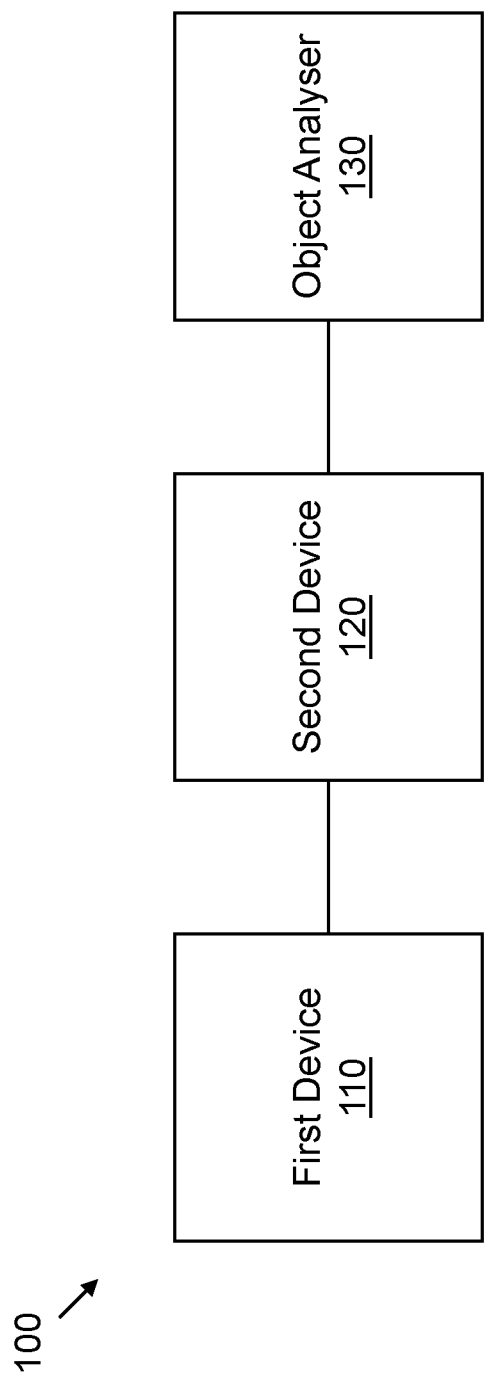
FIG. 1 shows a block diagram of an example of a hierarchical system in accordance with embodiments.

Referring to FIG. 1, there is shown an example of a system 100. The system 100 may comprise a distributed system. The system 100 may be in a self-driving vehicle (also referred to as an "autonomous vehicle"). The system 100 may be used to provide computer vision functionality in relation to the self-driving vehicle.

In this example, the system 100 comprises a first device 110. In this example, the first device 110 comprises an encoder 110. In this example, the encoder 110 generates encoded data. In this example, the encoder 110 receives data and encodes the received data to generate the encoded data based on the received data.

In this example, the system 100 comprises a second device 120. In this example, the second device 120 comprises a decoder 120. In this example, the decoder 120 generates decoded data. In this example, the decoder 120 receives the encoded data from the encoder 110 and decodes the encoded data to generate the decoded data.

In this example, the second device 120 obtains data by receiving the data from the first device 110. In some examples, the second device 120 obtains data in another manner. For example, the second device 120 may retrieve data from memory, as will be described in more detail below with reference to FIG. 2.

The first device 110 and the second device 120 may be embodied in hardware and/or software. The first device 110 and the second device 120 may have a client-server relationship. For example, the first device 110 may have a server role and the second device 120 may have a client role.

In this example, the first device 110 is communicatively coupled to the second device 120. In this example, the first device 110 is directly communicatively coupled to the second device 120. A communication protocol may be defined for communications between the first device 110 and the second device 120.

In some examples, the second device 120 transmits data to the first device 110. For example, the second device 120 may transmit control data (also referred to as "feedback data") to the first device 110. Such control data may control how the first device 110 processes (for example, encodes) data and/or may control one or more other operations of the first device 110.

In this example, the system 100 comprises an object analyser 130. The object analyser 130 may be embodied in hardware and/or software. In this example, the object analyser 130 is communicatively coupled to the second device 120. In this example, the object analyser 130 is configured to perform object analysis within data being processed by the second device 120, as will be described in more detail below. The object analyser 130 may control how the second device 120 processes (for example, decodes) data. Such control may comprise whether the second device 120 performs full or partial decoding, and may comprise the localization (also referred to as the "region of interest (RoI)" or the "bounding box") where further object analysis and/or decoding should focus, as will be described in more detail below. Such control may be based on the object analysis performed by the object analyser 130, or otherwise.

Although, in this example, the second device 120 and the object analyser 130 are depicted in FIG. 1 as being separate elements of the system 100, such separation may be logical rather than physical. As such, while, in some examples, the second device 120 and the object analyser 130 are provided as physically separate components of the system 100, in other examples, the second device 120 and the object analyser 130 are provided via one physical component of the system 100.

The system 100 may comprise one or more additional elements not shown in FIG. 1. Furthermore, although the system 100 depicted in FIG. 1 comprises a single first device 110 (comprising a single encoder, for example), a single second device 120 (comprising a single decoder, for example) and a single object analyser 130, in other examples the system 100 comprises more than one first device 110, more than one second device 120 and/or more than one object analyser 130.

As indicated above, in some examples, the first device 110 encodes data and provides the encoded data to the second device 120, and the second device 120 decodes the encoded data. In other examples, the first device 110 does not encode the data provided to the second device 120. In such other examples, the data provided from the first device 110 to the second device 120 is not in an encoded form.

Figure 2:
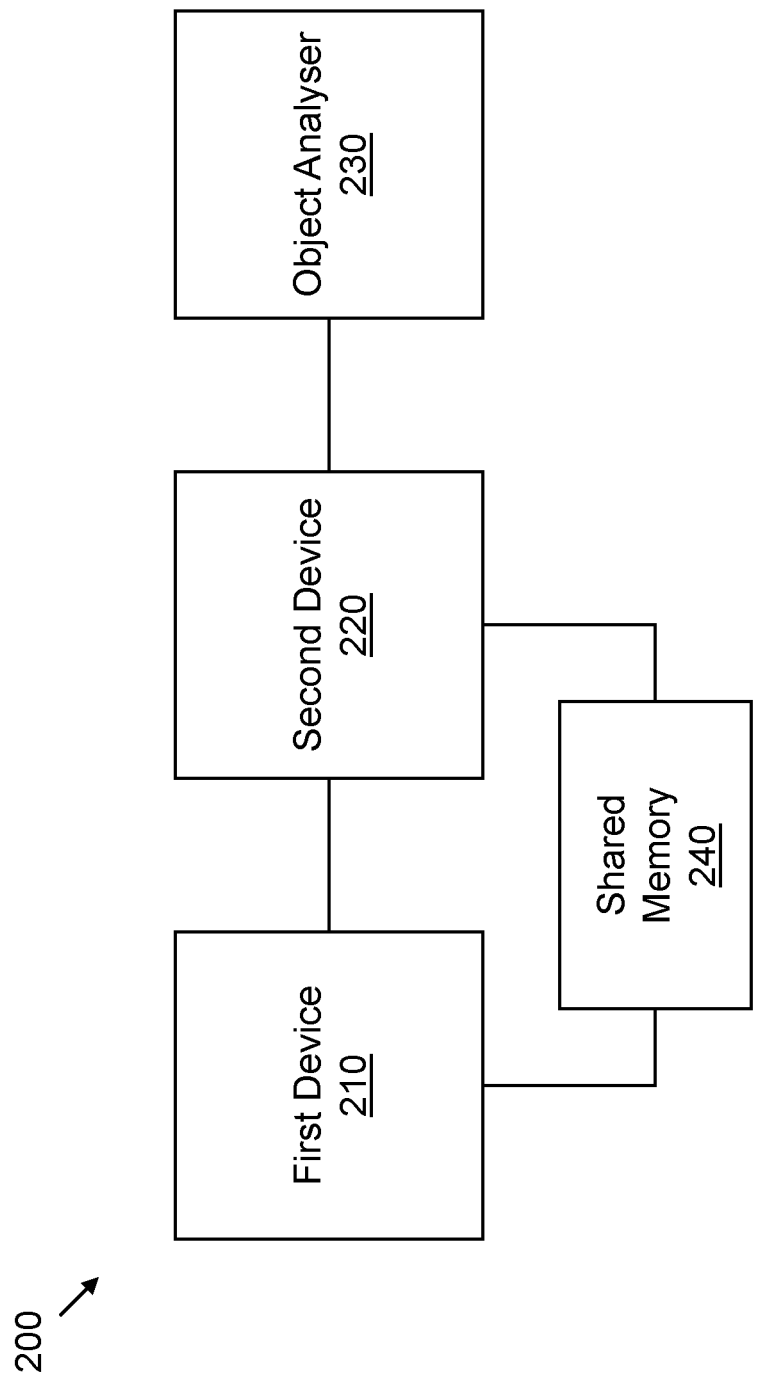
FIG. 2 shows a block diagram of another example of a hierarchical system in accordance with embodiments.

Referring to FIG. 2, there is shown an example of a system 200. The example system 200 depicted in FIG. 2 includes several elements that are the same as, or are similar to, corresponding elements in the example system 100 described above with reference to FIG. 1. Such elements are indicated using the same reference numeral but incremented by 100.

In this example, the system 200 comprises a shared memory 240. The shared memory 240 may comprise double data rate (DDR) memory. In this example, the shared memory 240 is shared between the first device 210 and the second device 220. In this example, the first device 210 is communicatively coupled to the shared memory 240. In this example, the second device 220 is communicatively coupled to the shared memory 240. In some examples, the object analyser 230 has access to the shared memory 240. In this example, the first device 210 writes to the shared memory 240. In this example, the second device 220 reads from the shared memory 240. As such, the second device 220 may obtain data by reading the data from the shared memory 240. In this example, the first device 210 is communicatively coupled to the second device 220 via the shared memory 240. In this example, the first device 210 is indirectly communicatively coupled to the second device 220 via the shared memory 240.

In this specific example, in addition to the first device 210 being indirectly communicatively coupled to the second device 220 via the shared memory 240, the first device 210 is also directly coupled to the second device 220. In some examples, the second device 220 uses the direct connection with the first device 210 to communicate control data to the first device 210. However, in some examples, the first device 210 is not directly coupled to the second device 220.

In some examples, the first device 210 provides encoded data to the second device 220. For example, the first device 210 may comprise encoder functionality and the second device 220 may comprise decoder functionality. In other examples, the data provided by the first device 210 to the second device 220 is not in an encoded form.

Figure 3:
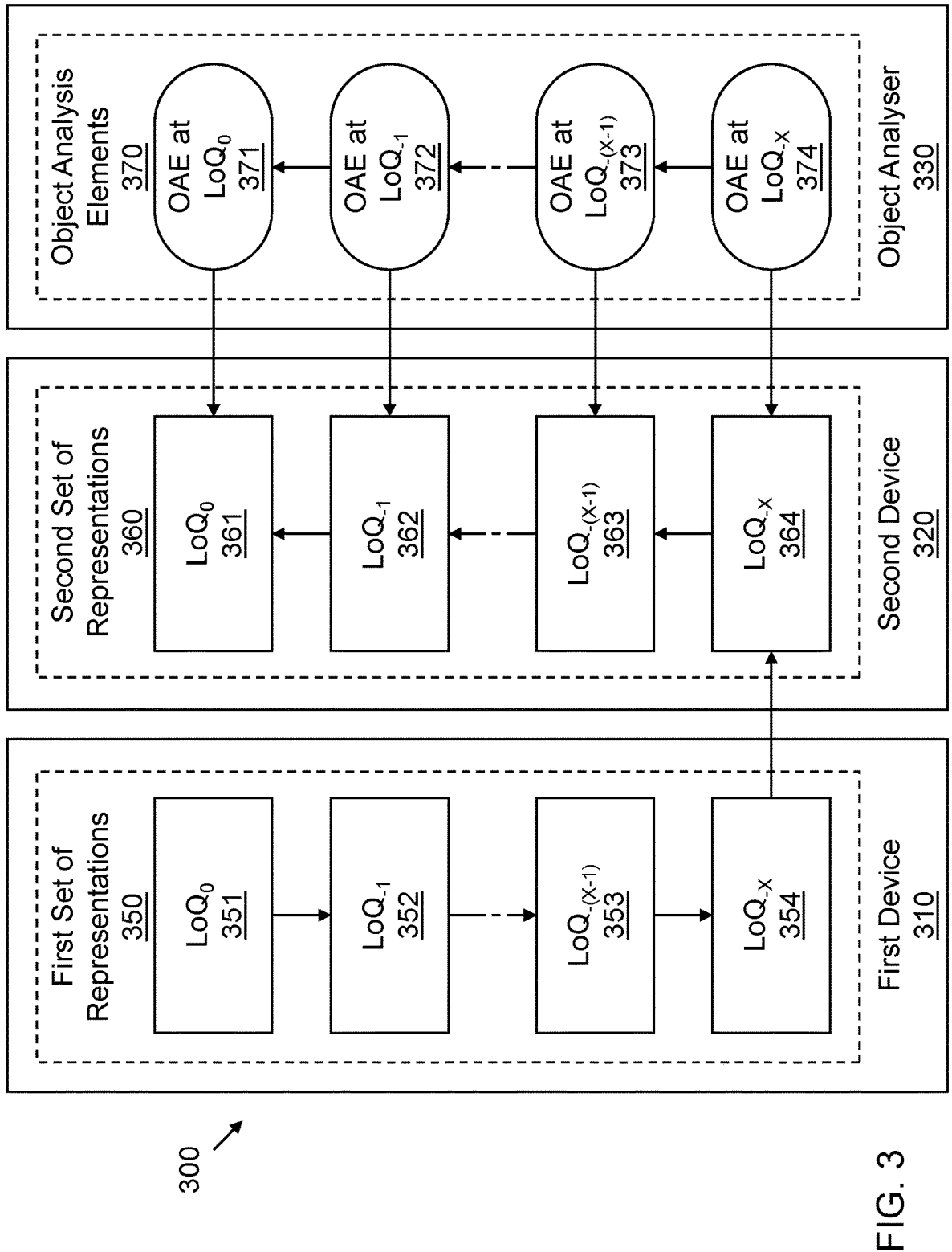
FIG. 3 shows a block diagram of another example of a hierarchical system in accordance with embodiments.

Referring to FIG. 3, there is shown an example of a system 300. The example system 300 depicted in FIG. 3 includes several elements that are the same as, or are similar to, corresponding elements in the example systems 100 and 200 described above with reference to FIGS. 1 and 2. Such elements are indicated using the same reference numeral but incremented by 200 and 100 respectively.

In this example, the system 300 comprises a hierarchical system 300. The hierarchical system 300 may be used to represent a signal in accordance with a structured hierarchy. Such a signal will generally be referred to hereinafter as a "hierarchically-structured signal". In this example, structuring the signal hierarchically comprises structuring the signal in accordance with a tiered hierarchy of representations (also referred to as "renditions" or "versions") of the signal. In this example, each of the representations of the signal is associated with a respective Level of Quality ("LoQ"). As such, in this example, the hierarchical system 300 processes data that is represented in accordance with a tiered hierarchy, where the tiered hierarchy includes multiple, different LoQs.

In some examples, the signal is encoded and decoded within the hierarchical system 300. In other examples, the signal is not subject to encoding and decoding within the hierarchical system 300.

For convenience and brevity, in this specific example, the signal is encoded and decoded within the hierarchical system 300. As such, in this example, the hierarchical system 300 comprises a hierarchical encoding system 300. In this specific example, in addition to structuring the signal hierarchically, the signal is also encoded and decoded in the hierarchical encoding system 300. A signal encoded in the hierarchical encoding system 300 may therefore be considered to be a "hierarchically-encoded signal". As such, in this example, the hierarchical encoding system 300 encodes the hierarchically-structured signal. Hierarchical encoding produces different levels of compressed images compared to at least some other encoding techniques. In this example, the tiered hierarchy comprises at least two tiers (also referred to as "levels"). The tiered hierarchy may add layers of detail and upscaling upon industry-standard codecs. Examples of such codecs include, but are not limited to, H.264 and High Efficiency Video Coding (HEVC). Alternatively, the tiered hierarchy may be a 'full-stack' hierarchy which does not depend on other standard codecs.

The reader is referred to International (PCT) patent application numbers PCT/IB2014/060716, PCT/IB2012/053660, PCT/IB2012/053722, PCT/IB2012/053723, PCT/IB2012/053724, PCT/IB2012/053725, PCT/IB2012/056689, PCT/IB2012/053726, PCT/GB2018/053551, PCT/GB2018/053552, and PCT/GB2018/053553, which describe further how data can be processed in such a tiered hierarchy and which are hereby incorporated by reference.

In this example, the first device 310 receives a representation of a signal at a relatively high resolution from a source. In this example, the relatively high resolution corresponds to the resolution of $LoQ_0$. In some examples, the first device 310 receives the representation 351 at $LoQ_0$ directly from the source. In some examples, the first device 310 receives the representation 351 at $LoQ_0$ indirectly from the source. In some examples, the source comprises an electronic device which generates and/or records a signal using one or more sensors. For example, in the case of a video signal, the electronic device may comprise a video camera. The video camera may record a scene at a specific, relatively high LoQ (for example, Ultra High Definition (UHD)). The video camera may use a number of sensors (for example, charge-coupled devices (CCDs), complementary metal-oxide semiconductor (CMOS), etc.) to capture information in the scene (for example, the intensity of light at a particular position in the scene). The video signal could be further processed and/or stored (by the camera and/or different apparatus) before being received by the first device 310.

In this specific example, the signal is in the form of a video signal comprising a sequence of images. It will be understood, however, that the signal may be of a different type. For example, the signal may comprise a sound signal, a multichannel sound signal, a picture, a two-dimensional image, a multi-view video signal, a 3D video signal, radar/lidar and other sparse data signals, a volumetric signal, a volumetric video signal, a medical imaging signal or a signal with more than four dimensions.

In this example, the hierarchical system 300 provides representations of the video signal at multiple different LoQs. One measure of the LoQ of a representation of a video signal is its resolution, or number of pixels. A higher resolution may correspond to a higher LoQ. The resolution may be spatial and/or temporal. Another measure of the LoQ of a representation of a video signal is whether the representation of the video signal is progressive or interlaced, with progressive corresponding to a higher LoQ than interlaced. Another measure of the LoQ may be a relative quality of a representation of the video signal. For example, two representations of the video signal may be at the same resolution, but one may still have a higher LoQ than the other one because it provides more details (e.g., more edges and/or contours) or a better bit-depth (e.g., HDR rather than SDR).

In this example, the first device 310 generates a first set of representations 350 of the signal. In this example, the first set of representations 350 comprises at least two representations of the signal. In this specific example, the first set of representations 350 comprises 'X+1' representations of the signal. In this example, each of the 'X+1' representations of the signal has (or "is at") an associated LoQ. In this example, one of the 'X+1' representations 351 has an LoQ of '0' (generally referred to hereinafter as being "at $LoQ_0$"), another one of the 'X+1' representations 352 is at $LoQ_{-1}$, and so on until a further one of the 'X+1' representations 353 is at $LoQ_{-(X-1)}$, and a final one of the 'X+1' representations 354 is at $LoQ_{-X}$. The first set of representations 350 may comprise one or more additional representations between the representation 352 at $LoQ_{-1}$ and the representation 353 at $LoQ_{-(X-1)}$. Although, in this example, the first set of representations 350 comprises at least four representations of the signal, a first set of representations 350 may comprise more or fewer than four representations of the signal in other examples.

The first device 310 may generate the first set of representations 350 in various different ways. In this example, the signal comprises a video signal. In this specific example, the representation 351 at $LoQ_0$ corresponds to an original representation of an image comprised in the video signal. The image may be considered to represent a time sample of the video signal. In this example, the first device 310 generates each of the representations 352, 353, 354, progressively at the lower LoQs (i.e. at the LoQs below $LoQ_0$) by downsampling (also known as "downscaling") the representation 351 at $LoQ_0$ to generate the representation 352 at $LoQ_{-1}$, by downsampling the representation 352 at $LoQ_{-1}$ to generate the representation 353 at $LoQ_{-(X-1)}$ (possibly generating one or more intermediate representations via downsampling), and by downsampling the representation 353 at $LoQ_{-(X-1)}$ to generate the representation 354 at $LoQ_{-X}$. In this example, downsampling results in reducing the resolution of the representations. As such, in this example, the resolution of the representations 351, 352, 353, 354 of the signal decreases as the LoQ decreases from '0' to '−X'. By way of a specific, non-limiting, example in a four-tier hierarchy, the representation 351 at $LoQ_0$ may correspond to a high-resolution image (for example, 8K at 120 frames per second), the representation 352 at $LoQ_{-1}$ may correspond to a medium-resolution image, the representation 353 at $LoQ_{-2}$ may correspond to a low-resolution image, and the representation 354 at $LoQ_{-3}$ may correspond to a thumbnail-resolution image (for example, below standard definition (SD)).

As such, in this example, each of the representations 531, 352, 353, 354 relates to the same time sample (i.e. image) of the video signal. This example therefore differs from a set of representations of different time samples of a video signal. A set of representations of different time samples of a video signal may, for example, comprise a first representation of the video signal at a first time, a second representation of the video signal at a second time and so on. Such representations of different time samples of a video signal may all be at the same LoQ whereas, in this example, the representations are associated with respective, different LoQs.

In this example, the first device 310 communicates the representation 354 at $LoQ_{-X}$ to the second device 320 (for example if the representation 354 at $LoQ_{-X}$ is not encoded) and/or communicates data to enable the second device 320 to derive the representation 354 at $LoQ_{-X}$ (for example an encoded version of the representation 354 at $LoQ_{-X}$, which the second device 320 can decode to derive the representation 354 at $LoQ_{-X}$).

It will be appreciated that the representations 351, 352, 353, 354 in the first set of representations 350 correspond to respective ones of the representations 361, 362, 363, 364 in the second set of representations 360. Where the first device 310 encodes the first set of representations 350 and where the encoding performed by the first device 310 is lossless, the representations 351, 352, 353, 354 in the second set of representations 350 are the same as the respective ones of the representations 361, 362, 363, 364 in the first set of representations 360. In other examples in which the first device 310 encodes the first set of representations 350, the representations 351, 352, 353, 354 in the first set of representations 350 correspond to, but may not be identical to, respective ones of the representations 361, 362, 363, 364 in the second set of representations 360.

In this example, the second device 320 obtains the representation 364 at $LoQ_{-X}$ as a result of the first device 310 communicating the representation 354 at $LoQ_{-X}$ and/or data to enable the second device 320 to derive the representation 354 at $LoQ_{-X}$. As indicated above, in some examples, the representation 364 at $LoQ_{-X}$ is the same as the representation 354 at $LoQ_{-X}$ and in other examples it is not identical.

In this example, the second device 320 can 'reverse' the processing performed by the first device 310 to obtain some of all of the second set of representations 360. In some examples, the second device 320 upsamples (or "upscales") the representation 364 at $LoQ_{-X}$ to obtain the representation 363 at $LoQ_{-(X-1)}$ and so on until the representation 362 at $LoQ_{-1}$ is upsampled to obtain the representation 361 at $LoQ_0$. Upscaling may use a statistical approach. A statistical approach may use an averaging function, for example. As such, the second device 320 may use the representation 364 at $LoQ_{-X}$ to obtain the representation 363 at $LoQ_{-(X-1)}$, where such use of the representation 364 at $LoQ_{-X}$ comprises upscaling the representation 364 at $LoQ_{-X}$. Although the second device 320 may 'fully' reverse the process to obtain the representation 361 at $LoQ_0$, in some examples, the second device 320 does not obtain the entire second set of representations 360. For example, the second device 320 may upscale up to, but not higher than, $LoQ_{-1}$ or an LoQ lower than $LoQ_{-1}$.

As such, in this example, the second device 320 obtains a first representation of the signal at a first LoQ, namely the representation 364 at $LoQ_{-X}$. The first representation, namely the representation 364 at $LoQ_{-X}$, is part of a set of representations of the signal, namely the second set of representations 360. In this example, the set of representations, namely the second set of representations 360, comprises a second representation of the signal at a second, higher LoQ. The second representation may comprise the representation 363 at $LoQ_{-(X-1)}$, the representation 362 at $LoQ_{-1}$, or the representation 361 at $LoQ_0$. In this example, the set of representations, namely the second set of representations 360, comprises a third representation of the signal at a third LoQ higher than the second LoQ. The third representation may comprise the representation 362 at $LoQ_{-1}$ or the representation 361 at $LoQ_0$. As such, in this example, the second set of representations 360, comprises multiple representations of the signal at respective LoQs, where each of the LoQs is equal to or higher than $LoQ_{-X}$. In some examples, the first device 310 also communicates reconstruction data (also referred to as "residual data" or "residuals") to the second device 320. The reconstruction data may enable the second device 320 to compensate for inaccuracies in the upsampling process performed by the second device 320, and thereby to obtain a more accurate reconstruction of the first set of representations 350. In particular, the second device 320 may upscale a representation at one LoQ (for example, $LoQ_{-X}$) to produce an approximation (or "prediction") of the representation at the immediately higher LoQ (for example, $LoQ_{-(X-1)}$). Reconstruction data may be used to adjust the approximation to account for the above-mentioned inaccuracies. The first device 310 may deliver a full set of reconstruction data such that lossless reconstruction may be achieved. The first device 310 may deliver quantised reconstruction data, which can lead to visually lossless or lossy reconstruction. The reader is referred to PCT/IB2014/060716, which describes reconstruction data in detail.

In this example, the object analyser 330 comprises at least one object analysis element 370. In this example, an object analysis element 370 is configured to perform object analysis within the second set of representations 360. In this example, the second device 320 comprises 'X+1' object analysis elements 371, 372, 373, 374. In this example, the number 'X+1' of object analysis elements 371, 372, 373, 374 is the same as the number of LoQs in the tiered hierarchy in accordance with which signals are encoded in the hierarchical system 300. However, in other examples, the number of object analysis elements is different from the number of LoQs.

In this example, one object analysis element 371 is at $LoQ_0$, another object analysis element 372 is at $LoQ_{-1}$, a further object analysis element 373 is at $LoQ_{-(X-1)}$ and a final object analysis element 374 is at $LoQ_{-X}$. In this example, the object analysis elements 371, 372, 373, 374 perform object analysis at $LoQ_0$, $LoQ_{-1}$, $LoQ_{-(X-1)}$ and $LoQ_{-X}$ respectively. For example, the object analysis elements 371, 372, 373, 374 may have been trained to perform one or more types of object analysis at $LoQ_0$, $LoQ_{-1}$, $LoQ_{-(X-1)}$ and $LoQ_{-X}$ respectively, as will be described in more detail below. For example, the object analysis elements 371, 372, 373, 374 may have been trained using training images having a resolution associated with $LoQ_0$, $LoQ_{-1}$, $LoQ_{-(X-1)}$ and $LoQ_{-X}$ respectively. In this example, the object analysis elements 371, 372, 373, 374 are optimised to perform object analysis at $LoQ_0$, $LoQ_{-1}$, $LoQ_{-(X-1)}$ and $LoQ_{-X}$ respectively. As such, in this example, a first object analysis element, namely the object analysis element 374 at $LoQ_{-X}$ is associated with a first LoQ, namely $LoQ_{-X}$, and a second object analysis element, namely the object analysis element 373 at $LoQ_{-(X-1)}$, is associated with a second, higher LoQ, namely $LoQ_{-(X-1)}$. In some examples, at least one LoQ does not have an associated object analysis element. For example, it may not be effective to perform object analysis at the at least one LoQ. In some examples, each LoQ has at least one associated object analysis element.

In this example, the object analysis element 374 at $LoQ_{-X}$ is communicatively coupled to the object analysis element 373 at $LoQ_{-(X-1)}$. For example, data output by the object analysis element 374 at $LoQ_{-X}$ may be provided to the object analysis element 373 at $LoQ_{-(X-1)}$. This may, in turn, enhance performance of the object analysis element 373 at $LoQ_{-(X-1)}$, compared to the object analysis element 373 at $LoQ_{-(X-1)}$ not being communicatively coupled to the object analysis element 374 at $LoQ_{-X}$. For example, a result of the object analysis performed by the object analysis element 374 at $LoQ_{-X}$ and/or data otherwise associated with the object analysis performed by the object analysis element 374 at $LoQ_{-X}$ may be provided to the object analysis element 373 at $LoQ_{-(X-1)}$. The object analysis element 373 at $LoQ_{-(X-1)}$ may, in turn, use such data in performing object analysis at $LoQ_{-(X-1)}$. The object analysis element 373 at $LoQ_{-(X-1)}$ may use other data associated with $LoQ_{-X}$ in addition to, or as an alternative to, using data from object analysis element 374 at $LoQ_{-X}$. For example, the object analysis element 373 at $LoQ_{-(X-1)}$ may be provided with the representation 364 at $LoQ_{-X}$ and/or data derived from the representation 364 at $LoQ_{-X}$. Using data associated with $LoQ_{-X}$ may increase the accuracy of the object analysis performed at $LoQ_{-(X-1)}$ compared to not using such data since the object analysis element 373 at $LoQ_{-(X-1)}$ has additional data, in addition to the representation 363 at $LoQ_{-(X-1)}$, in relation to which to perform object analysis. In this example, the object analysis element 371 at $LoQ_{-0}$ is communicatively coupled to the object analysis element 372 at $LoQ_{-1}$.

In some examples, an object analysis element 370 performs object analysis in relation to one or more representations of a given time sample of a signal and a result of the object analysis performed in relation to the given time sample of the signal is used to perform object analysis in relation to another time sample of the signal. The other time sample of the signal may be a later time sample of the signal. For example, object analysis performed in relation to an image in a sequence of images may be used to influence object analysis performed in relation to one or more following images in the sequence of images. This can enhance the object analysis performed in relation to one or more following images.

Object analysis may thereby be performed in the hierarchical system 300 at one or more LoQs within the second set of representations 360. In such examples, object analysis is therefore performed in a hierarchical system, namely the example hierarchical system 300.

An object analysis element may take different forms. In some examples, an object analysis element comprises a convolutional neural network (CNN). In some examples, an object analysis element comprises multiple CNNs. As such, object analysis may be performed using one or more CNNs. A CNN may be trained to perform object analysis in relation to a representation of a signal in various different ways. For example, a CNN may be trained to detect and localize one or more objects, and/or to recognise one or more objects within a representation of a signal. Although in some examples, an object analysis element comprises one or more CNNs, in other examples hierarchical applications of Long Short-term Memories (LSTMs) or Dense Neural Networks (DNNs) may be used. In some examples, the object analysis element may not comprise an Artificial Neural Network (ANN). For example, discrete optimisers could be used.

In some examples, performing object analysis comprises detecting an object. As such, an object analysis element 370 may be configured to perform object detection within one or more of the representations 361, 362, 363, 364 comprised in the second set of representations 360. In such examples, object detection is performed in the hierarchical system 300. Object detection relates to finding one or more instances of one or more objects of one or more particular classes and localizing the one or more objects within the representation. Object detection may therefore relate to detecting all objects belonging to certain classes for which the object analysis element 370 has been trained, as well as localizing them within the representation. An object analysis element 370 may, for example, have been trained to detect human faces and animals. If such an object analysis element 370 detects one or more such objects, the specific location of each such detected object is returned, for example via a bounding box. For example, a bounding box may be provided in relation to each human face and each animal detected in a representation. A result of such object detection may be a level of confidence that one or more objects have been detected and localized.

In some examples, performing object analysis comprises recognising an object. As such, an object analysis element 370 may be configured to perform object recognition within one or more of the representations 361, 362, 363, 364 comprised in the second set of representations 360. In such examples, object recognition is performed in the hierarchical system 300. Object recognition relates to identifying an object that has been detected. For example, object recognition may relate to determining a class label, such as 'dog', 'cat', 'Persian cat' etc, to which a detected animal belongs. In the case of a human face, object recognition may relate to recognising the identity of the particular person whose face has been detected. A result of such object recognition may, for example, be a level of confidence that a given detected animal is a cat. For example, a result of such object recognition may correspond to an 80% level of confidence that a cat has been recognised and a 20% level of confidence that a cat has not been recognised.

As such, one or more different types of object analysis including, but not limited to, object detection and object recognition may be performed within the second set of representations 360.

In some examples, a given type of object analysis (for example, object detection) is performed at only one LoQ within the second set of representations 360. For example, object detection may be performed within the representation 364 at $LoQ_{-X}$ only and not within any of the higher-LoQ representations 361, 362, 363 in the second set of representations 360. This may occur where, for example, an object has been detected and localized by the object analysis element 374 at $LoQ_{-X}$. In such a situation, performing further object detection at one or more higher LoQs, for example at $LoQ_{-(X-1)}$, may not represent efficient and effective use of resources of the object analyser 330 since the object has already been detected and localized.

Although, in this example, object analysis starts at the lowest LoQ, namely, $LoQ_{-X}$, in other examples object analysis starts at a higher LoQ. By starting at the lowest LoQ, additional processing time and/or resources may be saved where object analysis is performed successfully at the lowest LoQ, or at least where performing object analysis at the lowest LoQ contributes towards successful object analysis. In some examples, object analysis at the lowest LoQ may not appreciably contribute towards successful object analysis. Starting object analysis at a higher LoQ may, in such examples, be more efficient than starting at the lowest LoQ.

In some examples, object analysis ascends the tiered hierarchy, with object analysis being performed at successively higher LoQs. In some examples, object analysis may involve descending the tiered hierarchy. For example, while the tiered hierarchy may initially be ascended, object analysis may be performed at one or more lower LoQs than a current LoQ. Object analysis may, or may not, already have been performed at the one or more lower LoQs.

In some examples, where multiple different types of object analysis are performed, some or all of the types of object analysis start at the same LoQ. In some examples, where multiple different types of object analysis are performed, some or all of the types of object analysis start at different LoQs. This may be particularly, but not exclusively, effective where a given type of object analysis is more effective at higher or lower LoQs.

In some examples, a given type of object analysis (for example, object detection) is performed at multiple LoQs within the second set of representations 360. For example, object detection may be performed in relation to the representation 364 at $LoQ_{-X}$, but an object may not be detected by the object analysis element 374 at $LoQ_{-X}$. In such a situation, object detection may be performed at $LoQ_{-(X-1)}$ by the object analysis element 373 at $LoQ_{-(X-1)}$. If the object analysis element 373 at $LoQ_{-(X-1)}$ does not detect an object, object detection may be performed again at one or more higher LoQs. Although, in this example, where the object detection is performed at one LoQ (i.e. $LoQ_{-X}$) does not detect an object, object detection is performed at an immediately higher LoQ (i.e. $LoQ_{-(X-1)}$), in other examples, one or more immediately higher LoQs may be bypassed (or "jumped"). This may be particularly, but not exclusively, effective where a given type of object analysis is not sufficiently effective at a relatively low LoQ, but may be effective at one or more higher LoQs. Object detection and object recognition can be run effectively at multiple LoQs at the same time. If there are multiple objects, some may be detected with sufficient accuracy at a low LoQ and others may be detected higher up in the hierarchy. The same applies in relation to object recognition. Certain features can be recognised at a low LoQ (for example, human), some higher up (for example, male person with glasses), and some at top LoQs (for example, face recognition of a specific individual). Different recognition questions may be addressed at different LoQs. For example, as the hierarchy is ascended, the recognition question may be refined in order to get a more detailed description of the object concerned. For example, at a low LoQ (e.g. $LoQ_{-5}$) the question may be whether or not there is a person, at a higher LoQ (e.g. at $LoQ_{-4}$) the question may be the gender of the person, at a higher LoQ again (e.g. at $LoQ_{-3}$) recognising the identity, emotions etc.

A specific, non-limiting example will now be provided in which the object analysis element 374 performs object recognition within the representation 364 at $LoQ_{-X}$. In this specific example, a hypothesis is tested. For example, the hypothesis may be that a cat is in the representation 364 at $LoQ_{-X}$. The object analysis element 374 may have been trained to recognise cats within representations (for example, images) at $LoQ_{-X}$. The object analysis element 374 at $LoQ_{-X}$ may determine a result of the hypothesis based on analysing the representation 364 at $LoQ_{-X}$. For example, the object analysis element 374 at $LoQ_{-X}$ may determine that the level of confidence of the hypothesis being correct (i.e. that there is a cat in the representation 364 at $LoQ_{-X}$) is, for example, 20% and that the level of confidence of the hypothesis being incorrect (i.e. that there is not a cat in the representation 364 at $LoQ_{-X}$) is, for example, 80%. Such a result indicates that it is highly unlikely that there is cat in the representation 364 at $LoQ_{-X}$. This does not, however, imply that a cat is not in fact in any of the representations 361, 362, 363 at higher LoQs in the second set of representations 360. For example, the presence of an animal may be apparent at lower LoQs, but the animal specifically being a cat may only become evident at a higher LoQ. In some examples, the level of confidence of the hypothesis being correct is compared to a threshold level of confidence. In this specific example, the threshold level of confidence is assumed to be 50%. In this example, the determined level of confidence in the hypothesis being correct of 20% is below the threshold level of confidence of 50%. As such, in this example, the level of confidence associated with the object recognition performed within the representation 364 at $LoQ_{-X}$ does not meet the threshold level of confidence. Such a threshold level of confidence may be referred to as an "object-recognition threshold level of confidence" since it may be used as a threshold for a level of confidence associated with object recognition.

One or more predetermined actions may be taken in response to a determination that the level of confidence is below the threshold level of confidence.

One example of such a predetermined action is to cease (also referred to as "abort") performing object analysis within the second set of representations 360. For example, a low level of confidence at $LoQ_{-X}$ might indicate that it is unlikely that object analysis will be successful within the second set of representations 360. Additional resource usage associated with continuing to perform object analysis may thereby be saved, where the likelihood of successful object analysis is low. In some examples, a specific 'cease object analysis' threshold may be configured. The cease object analysis threshold may correspond to a very low likelihood of object analysis succeeding.

Another example of such a predetermined action is to continue the specific type of object analysis being performed within the second set of representations 360. For example, a low level of confidence associated with object recognition performed at $LoQ_{-X}$ might not imply that object recognition will not be successful within the second set of representations 360. For example, the object recognition may be more effective at a higher LoQ. A lower level of confidence in the object recognition performed at a lower LoQ may therefore not preclude object recognition being successful at a higher LoQ. For example, if the level of confidence in the object recognition performed at $LoQ_{-X}$ is below the threshold level of confidence, object recognition may be performed within the representation 363 at $LoQ_{-(X-1)}$. The level of confidence in the object recognition performed at $LoQ_{-(X-1)}$ may be compared to the same threshold level of confidence used at $LoQ_{-X}$. Alternatively, or additionally, the level of confidence in the object recognition performed at $LoQ_{-(X-1)}$ may be compared to another threshold level of confidence. In some examples, the other threshold level of confidence is associated with $LoQ_{-(X-1)}$ and is not associated with the threshold level of confidence at $LoQ_{-X}$. In some examples, the other threshold level of confidence is associated with the threshold level of confidence at $LoQ_{-X}$. For example, the other threshold level of confidence may be a function of the threshold level of confidence at $LoQ_{-X}$ and the threshold level of confidence at $LoQ_{-(X-1)}$. An example of such a function is an average. Object recognition may be performed at one or more LoQs above $LoQ_{-(X-1)}$.

In some examples, in addition to, or as an alternative to, comparing a level of confidence to a threshold level of confidence, a number of ascended LoQs may be compared to a threshold number of ascended LoQs. For example, where the threshold number of ascended LoQs is three, if a given type of object analysis has been performed at three LoQs and has not been successful, the given type of object analysis may be abandoned. In such examples, resource usage associated with the object analyser 330 and/or the second device 320 may be saved, compared to the given type of object analysis continuing, where the likelihood of success is low.

One or more predetermined actions may be taken in response to a determination that the level of confidence is above the threshold level of confidence.

One example of such a predetermined action is to conclude performing object analysis within the second set of representations 360. In some examples, concluding performing object analysis comprises concluding all types of object analysis. In some examples, concluding performing object analysis comprises concluding one or more given types of object analysis and starting or continuing one or more other types of object analysis. For example, a level of confidence in object recognition performed at $LoQ_{-X}$ might indicate that an object has been recognised with sufficient confidence that further object recognition at one or more higher LoQs is not performed. This may enable resources associated with the second device 320 and/or the object analyser 330 to be saved.

Another example of such a predetermined action is to continue performing object analysis within the second set of representations 360. In some examples, continuing performing object analysis comprises continuing all types of object analysis. In some examples, continuing performing object analysis comprises continuing one or more given types of object analysis. For example, a level of confidence in object recognition performed at $LoQ_{-X}$ might indicate that an object has been recognised with a relatively high degree of confidence. However, object recognition may nevertheless be performed at one or more higher LoQs to refine the degree of confidence in the object recognition performed at $LoQ_{-X}$. Performing object recognition at the one or more higher LoQs may result in the level of confidence changing, for example increasing and/or decreasing. Using the above, non-limiting, example of recognising a cat, the determined level of confidence in the hypothesis being correct (i.e. that a cat is in the representation 364 at $LoQ_{-X}$) of 20% may be below the threshold level of confidence in the hypothesis being correct of 50%. However, based on object recognition performed at $LoQ_{-(X-1)}$ the level of confidence in the hypothesis being correct may increase to 55%, which is above the threshold level of confidence in the hypothesis being correct of 50%. The level of confidence may increase in this way where, for example, the presence of the cat is significantly more apparent to the object analysis element 373 at $LoQ_{-(X-1)}$ than to the object analysis element 374 at $LoQ_{-X}$. This may be as a result of increased resolution at $LoQ_{-(X-1)}$.

As such, object analysis may be performed in relation to a hierarchically-structured signal in accordance with examples described herein in a more efficient manner than in relation to other types of signal. In this example, the object analysis element 374 may perform object analysis at the lowest LoQ, namely $LoQ_{-X}$. The representation 364 at $LoQ_{-X}$ is a different, lower-LoQ representation of the signal than the representation 361 at $LoQ_0$. As indicated above, the representation 361 at $LoQ_0$ may correspond to the original, source representation of the signal, at least in terms of resolution. As such, the example system 300 depicted in FIG. 3 differs from a system in which object analysis is performed within a representation of a signal where the representation is not part of a set of representations of the signal (for example, at different image resolutions). The example system 300 depicted in FIG. 3, in contrast, comprises a hierarchical system 300 in which the signal is structured in accordance with a tiered hierarchy comprising multiple different representations of the signal at multiple different respective LoQs. Performing object analysis within a representation at a relatively low LoQ in the tiered hierarchy may result in quicker object analysis than where analysis is performed within a representation of a signal that is not part of a set of representations of the signal. One reason for this is that the amount of time taken for the second device 320 to obtain the representation at $LoQ_{-X}$ (also known as "latency") may be less than the time that would be taken for the second device 320 to obtain a representation at $LoQ_0$. This is because the amount of data for the second device 320 to obtain is lower for the representation at $LoQ_{-X}$ than for the representation at $LoQ_0$. Where object analysis may be performed successfully at $LoQ_{-X}$, the time to perform such object analysis may be lower than the time taken to perform object analysis at $LoQ_0$. A factor in such a consideration may be the amount of time involved in the processing performed by the first device 310 to generate the representation 354 at $LoQ_{-X}$. If the time involved in the first device 310 generating the representation 354 at $LoQ_{-X}$, communicating the representation 354 at $LoQ_{-X}$ to the second device 320, and the second device 320 successfully performing object analysis (which may involve the second device 320 upsampling all or part of the representation 364 at $LoQ_{-X}$) would be less than the amount of time involved in the first device 310 communicating the representation 351 at $LoQ_0$ to the second device 320, and the second device 320 successfully performing object analysis at $LoQ_0$, then a processing time saving may be made. Such a time-saving may be particularly, but not exclusively, effective in real-time systems in which processing time reductions may enhance performance. For example, processing time reductions may enhance performance in computer vision systems. In some examples, the reduced amount of data involved in communicating the representation 354 at $LoQ_{-X}$ to the second device 320 compared to communicating the representation 351 at $LoQ_0$ to the second device 320 may represent an effective processing time saving even where the processing performed by the first device 310 is time-intensive. For example, the first device 300 may generate and store the representation 354 at $LoQ_{-X}$ in shared memory (240; FIG. 2). At a later time, the second device 320 may retrieve the representation 354 at $LoQ_{-X}$ from the shared memory (240; FIG. 2) to perform object analysis within the representation 364 at $LoQ_{-X}$. The retrieval time may be lower in the case of the second device 320 retrieving the representation 354 at $LoQ_{-X}$ than if the second device 320 were to retrieve the representation 351 at $LoQ_0$ in view of the smaller amount of data to be retrieved. In some examples, performing object analysis at a lower LoQ may in fact be more effective than performing object analysis at a higher LoQ. For example, de-noising may occur at lower LoQs with respect to higher LoQs. Object analysis may be more effective in a de-noised representation of the signal even where, for example, the resolution is lower. Performing object analysis at multiple different LoQs may enhance object analysis compared to object analysis being performed at a single LoQ. For example, an object analysis element (for example, comprising a CNN) may identify different features at different LoQs. For example, different features may be identified at different resolutions. By way of an example, a representation of a signal at a relatively low LoQ may provide a full picture of a scene represented by the signal. Object detection may be carried out effectively in relation to such a representation of the signal. For example, a human may be detected, localized and recognised at a low LoQ, which may trigger an object avoidance procedure. In such an example, additional details such as whether the human is male or female or whether they are wearing sunglasses, which could be identified using further object analysis, may not be needed. Such further detail may only become apparent at a higher LoQ for example.

Object detection and localization may help define one or more RoIs. Further object analysis, for example object recognition, may then be constrained to being performed within the one or more RoIs as opposed to being performed within a full representation. As such the part(s) of the representation outside the RoI(s) may effectively be discarded in terms of the further object analysis. For example, where the object detection has detected and localized an object at the relatively low LoQ, further object analysis at the relatively low LoQ and/or at the intermediate LoQ and/or at the relatively high LoQ constrained to the RoI may be used to adapt the object avoidance procedure. For example, the object avoidance procedure may be aborted if the detected object is determined not to present a collision risk, for example as a result of the nature of the object having been recognised based on object recognition.

Figure 4:
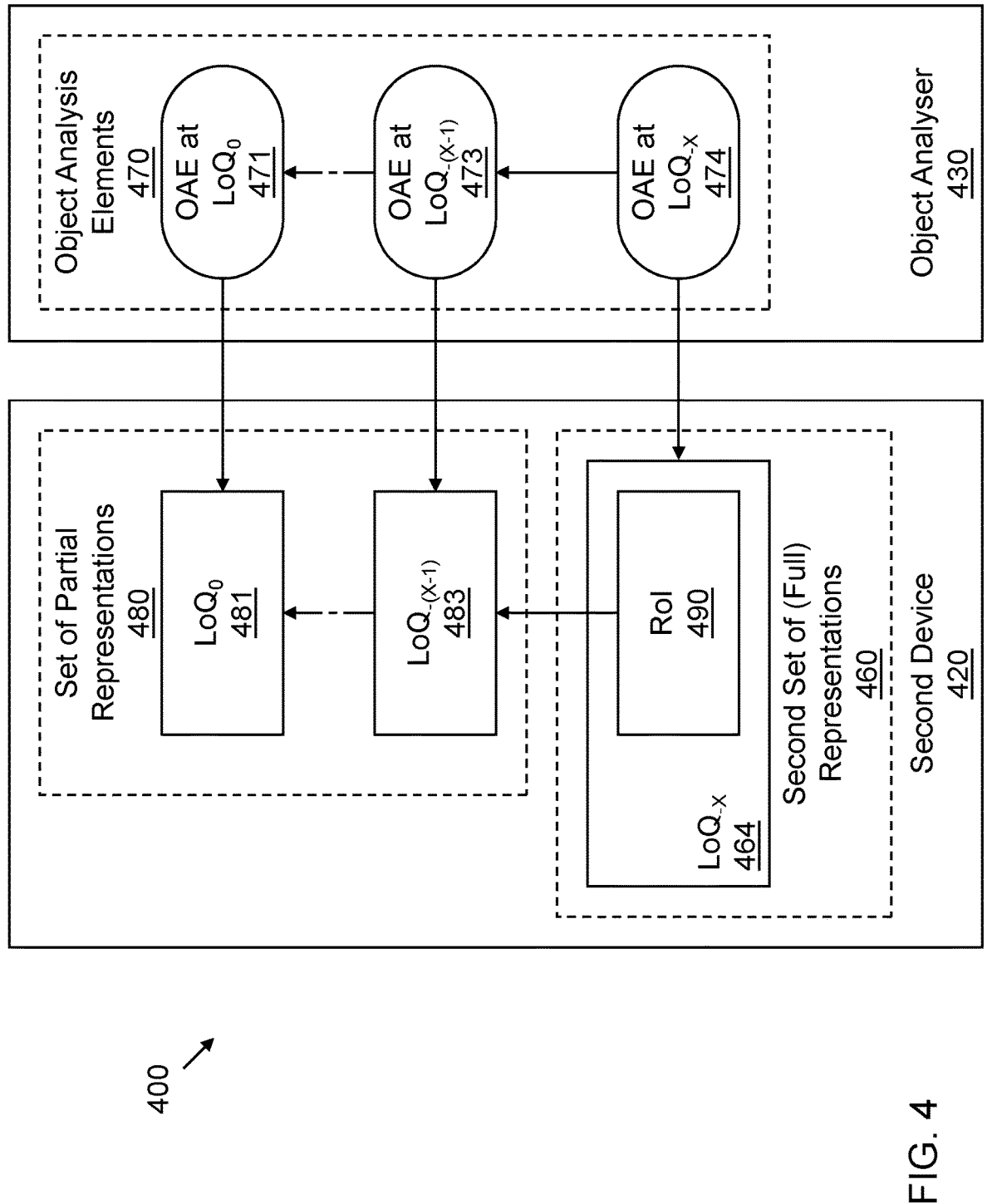
FIG. 4 shows a block diagram of an example of a part of another example of a hierarchical system in accordance with embodiments.

Referring to FIG. 4, there is shown an example of part of an example system 400. The example system 400 depicted in FIG. 4 includes several elements that are the same as or are similar to corresponding elements in the example systems 100, 200 and 300 described above with reference to FIGS. 1, 2 and 3. Such elements are indicated using the same reference numeral but incremented by 300, 200 and 100 respectively.

In this specific example, the second set of representations 460 comprises a single representation 464 at $LoQ_{-X}$. In this example, the object analysis element 474 at $LoQ_{-X}$ has performed object analysis within the representation 464 at $LoQ_{-X}$. In this example, a result of the object analysis performed by the object analysis element 474 at $LoQ_{-X}$ is that an object has been detected and localized as indicated by the RoI 490 of the representation 464 at $LoQ_{-X}$. In this example, the RoI corresponds to a sub-region of the representation 464 at $LoQ_{-X}$. Using the above, non-limiting example, object recognition in relation to a cat may be performed in the representation 464 at $LoQ_{-X}$ and an animal in the representation 464 at $LoQ_{-X}$ is detected within the RoI 490. The detected animal is a candidate to be a cat. In this example, the RoI 490 represents part of the representation 464 at $LoQ_{-X}$ that is of interest. In this example, the part of the representation 464 at $LoQ_{-X}$ corresponding to the RoI 490 is of interest because it contains an animal, the animal potentially being a cat.

In this example, the object analysis element 474 at $LoQ_{-X}$ performs object recognition within the within the RoI 490. In this example, it is assumed that the object analysis element 474 at $LoQ_{-X}$ does not recognise the animal within the RoI 490 as being a cat.

In this example, the decoder 420 obtains a set of partial representations 480 of the signal. This is in contrast to the example system 300 described above with reference to FIG. 3 in which all of the representations 361, 362, 363, 364 obtained by the decoder 320 are fully obtained. In this example, the second device 420 upscales only the part of the representation 464 at $LoQ_{-X}$ corresponding to the RoI 490 to obtain the partial representation 483 at $LoQ_{-(X-1)}$. In this specific example, the partial representation 483 at $LoQ_{-(X-1)}$ contains a detected animal. In this example, the representation 483 at $LoQ_{-(X-1)}$ is a partial representation in that the full representation at $LoQ_{-(X-1)}$ (363; FIG. 3) has not been obtained. As such, in this example, the second device 420 uses part of the representation 464 at $LoQ_{-X}$ to obtain the partial representation 483 at $LoQ_{-(X-1)}$. In this example, the second device 420 does not upscale the part of the representation 464 at $LoQ_{-X}$ outside the RoI 490. This may be the case even where object analysis has been performed in the part of the representation 464 at $LoQ_{-X}$ outside the RoI 490. In this example, the object analysis element 473 at $LoQ_{-(X-1)}$ performs object analysis within the partial representation 483 at $LoQ_{-(X-1)}$. As such, in this example, object recognition is performed within the partial representation 483 at $LoQ_{-(X-1)}$ and not within a full representation (363; FIG. 3) at $LoQ_{-(X-1)}$. In this specific example, such object recognition relates to identifying whether the detected animal is a cat. In this example, the second device 420 upscales the partial representation 483 at $LoQ_{-(X-1)}$ to obtain the partial representation 481 at $LoQ_0$. For example, object recognition may not have been successful at the levels up to $LoQ_0$. Such upscaling may involve obtaining one or more intermediate partial representations of the signal. Such upscaling may involve identifying a further RoI in the partial representation 483 at $LoQ_{-(X-1)}$ and upscaling the part of the partial representation 483 at $LoQ_{-(X-1)}$ corresponding to that RoI. In this example, the object analysis element 471 at $LoQ_0$ performs object analysis within the partial representation 481 at $LoQ_0$. Although, in this example, the second device 420 partially processes (for example, partially decodes) up to $LoQ_0$, in other examples the second device 420 stops at a lower LoQ. This may be considered to correspond to "zooming" or "cropping" within one or more representations of a signal with respect to one or more RoIs.

In some examples, the second device 420 receives control data to control, for example, whether full or partial processing (for example, decoding) should be performed at a given LoQ. In some examples, the second device 420 receives the control data directly from the object analyser 430. In some examples, the second device 420 receives the control data from an intermediate element between the second device 420 and the object analyser 430. An example of such an intermediate element is a dedicated RoI identification element that can identify one or more RoIs.

In this specific example, only one object has been detected and localized and only one RoI 490 has been identified. In some examples, more than one object is detected and localized. In such examples, multiple RoIs 490 may be used.

As such, in this example, the object analysis may be performed in conjunction with a partial, rather than a full, representation. Such partial processing may enable processing times to be reduced compared to full processing. In addition, such partial processing may involve the second device 420 obtaining and processing less data to enable object analysis to be performed than full processing. A hierarchically-structured signal in accordance with example described herein may be particularly suited to partial processing. Such partial processing, in effect, enables navigation to a part of a representation that is of interest.

As such, in accordance with examples described herein, object analysis may be performed using at least part of a representation of a signal at a first LoQ (for example, at $LoQ_{-X}$), the representation of the signal at the first LoQ having been generated using a representation of the signal at a second, higher LoQ (for example, at $LoQ_{-(X-1)}$ and above), wherein performing object analysis comprises performing object detection and/or object recognition. Performing such object analysis using at least part of the representation of the signal at the first LoQ may comprise performing object analysis within the representation of the signal at the first LoQ and/or obtaining one or more full and/or partial representations of the signal at one or more higher LoQs and performing object analysis within the one or more full and/or partial representations of the signal at the one or more higher LoQs.

Further, in accordance with examples described herein, object analysis may be performed within an image in a multi-resolution image format in which multiple versions of an image are available at different respective image resolutions. The multi-resolution image format may correspond to a format in which the image is hierarchically-structured as described herein.

Figure 5:
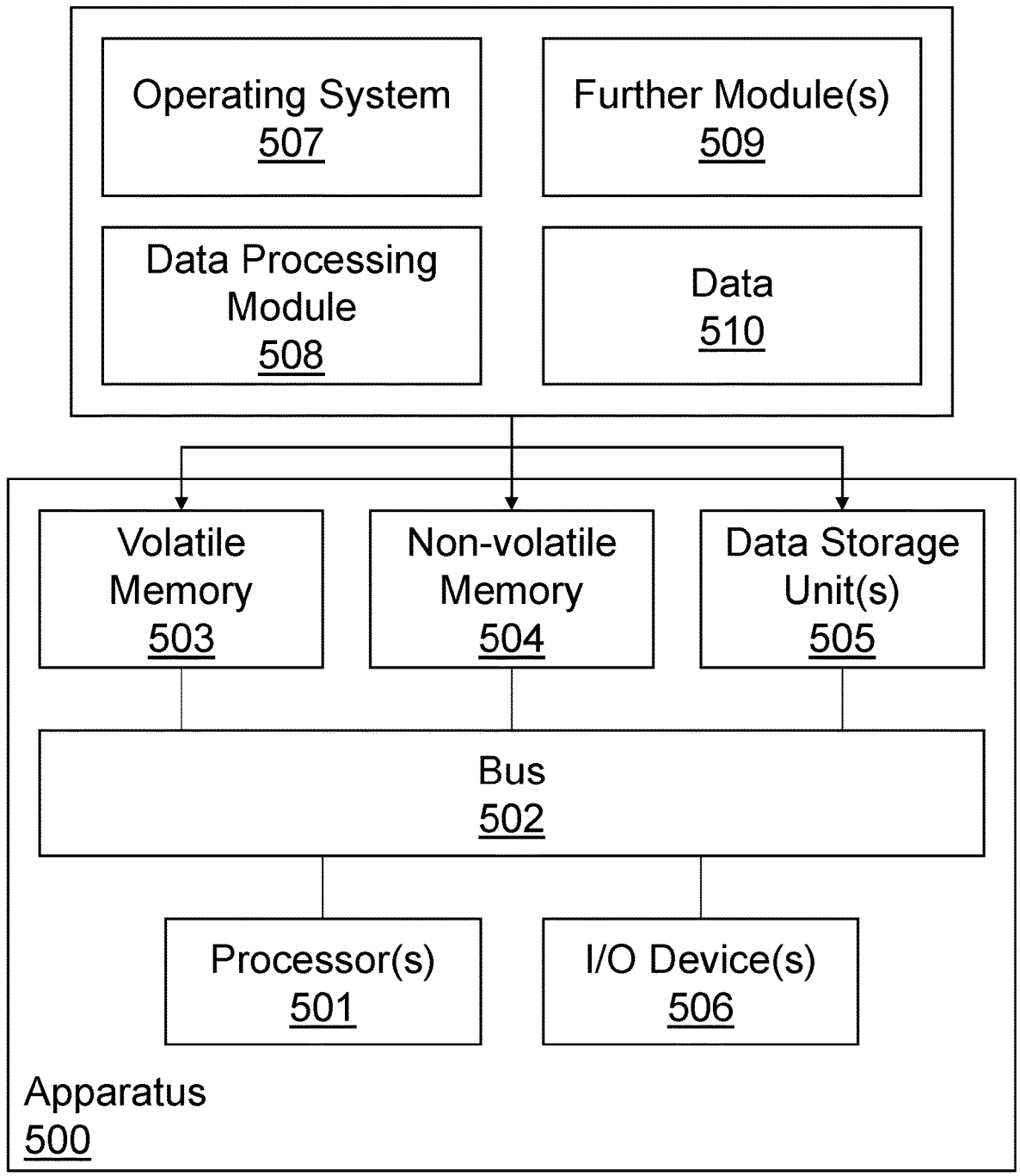
FIG. 5 shows a block diagram of an example of an apparatus in accordance with embodiments.

Further, in accordance with examples described herein, a representation of a signal may be partially processed (for example, partially decoded, partially reconstructed, partially upscaled) in response to object analysis performed within the representation identifying a candidate object in an RoI within the representation of the signal, wherein the partial processing is performed in relation to the Rot Referring to FIG. 5, there is shown a schematic block diagram of an example of an apparatus 500.

Examples of the apparatus 500 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device.

In this example, the apparatus 500 comprises one or more processors 501 configured to process information and/or instructions. The one or more processors 501 may comprise a central processing unit (CPU). The one or more processors 501 are coupled with a bus 502. Operations performed by the one or more processors 501 may be carried out by hardware and/or software. The one or more processors 501 may comprise multiple co-located processors or multiple disparately located processors.

In this example, the apparatus 500 comprises computer-useable volatile memory 503 configured to store information and/or instructions for the one or more processors 501. The computer-useable volatile memory 503 is coupled with the bus 502. The computer-useable volatile memory 503 may comprise random access memory (RAM).

In this example, the apparatus 500 comprises computer-useable non-volatile memory 504 configured to store information and/or instructions for the one or more processors 501. The computer-useable non-volatile memory 504 is coupled with the bus 502. The computer-useable non-volatile memory 504 may comprise read-only memory (ROM).

In this example, the apparatus 500 comprises one or more data-storage units 505 configured to store information and/or instructions. The one or more data-storage units 505 are coupled with the bus 502. The one or more data-storage units 505 may for example comprise a magnetic or optical disk and disk drive or a solid-state drive (SSD).

In this example, the apparatus 500 comprises one or more input/output (I/O) devices 506 configured to communicate information to and/or from the one or more processors 501. The one or more I/O devices 506 are coupled with the bus 502. The one or more I/O devices 506 may comprise at least one network interface. The at least one network interface may enable the apparatus 500 to communicate via one or more data communications networks. Examples of data communications networks include, but are not limited to, the Internet and a Local Area Network (LAN). The one or more I/O devices 506 may enable a user to provide input to the apparatus 500 via one or more input devices (not shown). The one or more I/O devices 506 may enable information to be provided to a user via one or more output devices (not shown).

Various other entities are depicted for the apparatus 500. For example, when present, an operating system 507, data processing module 508, one or more further modules 509, and data 510 are shown as residing in one, or a combination, of the computer-usable volatile memory 503, computer-usable non-volatile memory 504 and the one or more data-storage units 505. The signal processing module 508 may be implemented by way of computer program code stored in memory locations within the computer-usable non-volatile memory 504, computer-readable storage media within the one or more data-storage units 505 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 500 may therefore comprise a data processing module 508 which can be executed by the one or more processors 501. The data processing module 508 can be configured to include instructions to implement at least some of the operations described herein. During operation, the one or more processors 501 launch, run, execute, interpret or otherwise perform the instructions in the data processing module 508.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 500 may comprise more, fewer and/or different components from those depicted in FIG. 5.

The apparatus 500 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of performing object detection within a set of representations of a hierarchically-structured signal, wherein the hierarchically-structured signal is structured in accordance with a tiered hierarchy of representations of an original signal and each of the representations is associated with respective level of quality, the set of representations comprising at least a first representation of the original signal at a first level of quality and a second representation of the original signal at a second, higher level of quality, wherein the second representation is based on reconstruction data used to adjust the first representation, the method comprising:

performing object detection within one or more representations to find one or more instances of one or more objects of one or more particular classes and localizing the one or more objects within the one or more representations.

2. A method according to claim 1, wherein said object detection is performed using at least one convolutional neural network (CNN).

3. A method according to claim 2, wherein said object detection is performed using a first CNN associated with the first level of quality and a second CNN associated with the second level of quality.

4. A method according to claim 3, wherein data output by the first CNN is provided to the second CNN.

5. A method according to claim 1, comprising performing object recognition within one or more of the set of representations.

6. A method according to claim 1, comprising obtaining the first representation by decoding a tier of the hierarchically-structured signal, wherein the hierarchically-structured signal is encoded in a hierarchically-encoded signal received from an encoder.

7. A method according to claim 1, comprising obtaining at least part of the second representation using at least part of the first representation.

8. A method according to claim 7, wherein the at least part of the second representation is obtained in response to determining that a level of confidence associated with object recognition performed within the first representation does not meet an object-recognition threshold level of confidence.

9. A method according to claim 7, comprising obtaining only part of the second representation using only part of the first representation.

10. A method according to claim 9, wherein object detection and/or object recognition is performed within the part of the second representation.

11. A method according to claim 10, wherein the part of the first representation corresponds to a region of interest within the first representation.

12. A method according to claim 1, wherein the signal comprises a video signal, wherein the first and second representations are each of the same time sample of the video signal, wherein the level of quality corresponds to an image resolution.

13. A method according to claim 1, wherein the set of representations comprises a third representation of the signal at a third level of quality, the third level of quality being higher than the second level of quality.

14. A method according to claim 1, wherein the method is performed in a hierarchical system.

15. An apparatus configured to perform object detection detection within a set of representations of a hierarchically-structured signal, wherein the hierarchically-structured signal is structured in accordance with a tiered hierarchy of representations of an original signal and each of the representations is associated with respective level of quality, the set of representations comprising at least a first representation of the original signal at a first level of quality and a second representation of the original signal at a second, higher level of quality, wherein the second representation is based on reconstruction data used to adjust the first representation, the apparatus comprising:
a processor;
a non-tranitory computer-readable medium having stored therein computer executable instructions that, when executed by the processor, cause the apparatus to:
perform object detection within one or more representations to find one or more instances of one or more objects of one or more particular classes and localizing the one or more objects within the one or more representations.

16. A non-transitory computer-readable medium having stored therein computer executable instructions that, when executed by a processor of a computing system, cause the computing system to perform object detection within a set of representations of a hierarchically-structured signal, wherein the hierarchically-structured signal is structured in accordance with a tiered hierarchy of representations of an original signal and each of the representations is associated with respective level of quality, the set of representations comprising at least a first representation of the original signal at a first level of quality and a second representation of the original signal at a second, higher level of quality, wherein the second representation is based on reconstruction data used to adjust the first representation, the computing system caused to:
perform object detection within one or more representations to find one or more instances of one or more objects of one or more particular classes and localizing the one or more objects within the one or more representations.

* * * * *